United States Patent
Dunn et al.

(10) Patent No.: US 10,614,852 B2
(45) Date of Patent: Apr. 7, 2020

(54) DATA-CENTER DRIVE WITH SPLIT-ACTUATOR THAT INCREASES READ/WRITE PERFORMANCE VIA DATA STRIPING

(71) Applicant: KABUSHIKI KAISHA TOSHIBA, Tokyo (JP)

(72) Inventors: Eric R. Dunn, Cupertino, CA (US); Thorsten Schmidt, Livermore, CA (US)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/205,711

(22) Filed: Nov. 30, 2018

(65) Prior Publication Data

US 2020/0020357 A1    Jan. 16, 2020

Related U.S. Application Data

(60) Provisional application No. 62/695,939, filed on Jul. 10, 2018.

(51) Int. Cl.
| | |
|---|---|
| G11B 5/09 | (2006.01) |
| G11B 20/12 | (2006.01) |
| G06F 12/10 | (2016.01) |
| G11B 5/48 | (2006.01) |
| G11B 5/55 | (2006.01) |
| G06F 3/06 | (2006.01) |

(52) U.S. Cl.
CPC ......... *G11B 20/1217* (2013.01); *G06F 3/064* (2013.01); *G06F 3/0613* (2013.01); *G06F 3/0659* (2013.01); *G06F 3/0676* (2013.01); *G06F 12/10* (2013.01); *G11B 5/4813* (2013.01); *G11B 5/5526* (2013.01); *G06F 2212/1044* (2013.01); *G06F 2212/657* (2013.01); *G11B 2020/1221* (2013.01)

(58) Field of Classification Search
None
See application file for complete search history.

(56) References Cited

U.S. PATENT DOCUMENTS

| | | | | |
|---|---|---|---|---|
| 5,384,671 | A | * | 1/1995 | Fisher .................. G11B 5/5526 360/49 |
| 5,517,631 | A | * | 5/1996 | Machado ........... G05B 19/0421 360/77.02 |

(Continued)

*Primary Examiner* — Peter Vincent Agustin
(74) *Attorney, Agent, or Firm* — Kim & Stewart LLP (57) ABSTRACT

A method for writing data in a disk drive having actuators each controlling arms extending over disk surfaces, including: receiving a write command from a host; receiving from the host data; dividing the data into data blocks; determining: a first surface from the disk surfaces where data is written by a first head of an arm controlled by a first actuator of the actuators; and a second surface from the disk surfaces where data is written by a second head of an arm controlled by a second actuator of the actuators; determining storage blocks of each of the first and the second surface; and writing first data blocks of the divided data blocks to the determined storage blocks of the first surface using the first head while writing second data blocks of the divided data blocks to the determined storage blocks of the second surface using the second head.

15 Claims, 7 Drawing Sheets

(56) References Cited

U.S. PATENT DOCUMENTS

| | | | | |
|---|---|---|---|---|
| 5,729,525 A | * | 3/1998 | Ishida | G11B 7/0037 369/275.3 |
| 5,983,485 A | | 11/1999 | Misso | |
| 6,307,704 B1 | * | 10/2001 | Seo | G11B 5/012 360/48 |
| 6,314,232 B2 | * | 11/2001 | Kizu | G11B 20/1251 386/243 |
| 6,370,091 B1 | * | 4/2002 | Kuroda | G11B 20/00615 369/30.08 |
| 6,560,075 B2 | | 5/2003 | Price et al. | |
| 6,847,504 B1 | | 1/2005 | Bennett et al. | |
| 6,914,746 B1 | * | 7/2005 | Meyer | G11B 5/5552 360/78.12 |
| 7,430,091 B2 | | 9/2008 | Manasse | |
| 2001/0012446 A1 | * | 8/2001 | Kizu | G11B 20/1251 386/314 |
| 2002/0060885 A1 | | 5/2002 | Money | |

* cited by examiner

| LBA | STORAGE BLOCK LOCATION | PHYSICAL LOCATION |
|---|---|---|
| start_LBA | 1 | Surface 0, PBA=0 |
| start_LBA+1 | 2 | Surface 1, PBA=0 |
| start_LBA+2 | 3 | Surface 0, PBA=1 |
| start_LBA+3 | 4 | Surface 1, PBA=1 |

DATA-CENTER DRIVE WITH SPLIT-ACTUATOR THAT INCREASES READ/WRITE PERFORMANCE VIA DATA STRIPING

CROSS-REFERENCE TO RELATED APPLICATION

This application is based upon and claims the benefit of priority from U.S. Provisional Patent Application Ser. No. 62/695,939, filed Jul. 10, 2018, the entire contents of which application are incorporated herein by reference.

BACKGROUND

A hard disk drive (HDD) is widely used in the field of computer systems, and the demand for a storage system capable of handling a large amount of data in shorter time is still growing. To achieve such a high performance storage system, several approaches are proposed across different technical fields such as mechanical features including a smarter magnetic head or actuator and algorithms for faster data access The effective approach for achieving high-speed disk access may depend on a manner of data access, i.e., random access or sequential access. For example, a split-actuator drive is known to achieve higher speed random access using two independent actuator assemblies. In general, a single actuator drive has an actuator coupled to a plurality of arms and heads, and reads/writes data from/to a plurality of disks via the heads of the single actuator. The split actuator drive has two or more independent actuators, each of which may control the arms to access the disks in parallel, which may improve read/write transfer rates, especially when random access happens across the disks. On the other hand, there is a need for a disk drive that achieves higher data transfer rates in both random and sequential access.

SUMMARY

An embodiment of the present invention provides a method for writing data in a disk drive having a plurality of actuators that each controls a plurality of arms extending over a plurality of disk surfaces. The method comprises: receiving a write command from a host device; receiving from the host device data to be written by the write command; dividing the received data into data blocks; determining: a first surface from the plurality of disk surfaces where data is written by a first head of an arm controlled by a first actuator of the plurality of actuators; and a second surface from the plurality of disk surfaces where data is written by a second head of an arm controlled by a second actuator of the plurality of actuators; determining one or more storage blocks of each of the first and the second surface where the divided data blocks are written; and writing one or more first data blocks of the divided data blocks to the determined storage blocks of the first surface using the first head while writing one or more second data blocks of the divided data blocks to the determined storage blocks of the second surface using the second head.

Another embodiment of the present invention provides a method for reading data in a disk drive having a plurality of actuators that each controls a plurality of arms extending over a plurality of disk surfaces. The method comprises: receiving a read command from a host device; determining one or more storage blocks of a first surface of the plurality of disk surfaces and one or more storage blocks of a second surface of the plurality of disk surfaces that store data specified by the read command; reading one or more data blocks from the determined storage blocks of the first surface using a first actuator of the plurality of actuators while reading one or more data blocks from the determined storage blocks of the second surface using a second actuator of the plurality of actuators; merging the data blocks read from the first and the second surface into the specified data; and transmitting the merged data to the host device.

Yet another embodiment of the present invention provides a disk drive comprising: a first actuator that controls an arm having a first head and extending over a first surface of a plurality of disk surfaces; a second actuator that controls an arm having a second head and extending over a second surface of a plurality of disk surfaces other than the first surface; and a controller configured to: in response to a command for writing data from a host device, write one or more first divided data blocks of the data onto one or more storage blocks of the first surface using the first head while writing one or more second divided data blocks of the data onto one or more storage blocks of the second surface using the second head; and in response to a command for reading data from the host device, read the first divided data blocks of the data from the storage blocks of the first surface using the first head while reading the second divided data blocks of the data from the storage blocks of the second surface using the second head.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
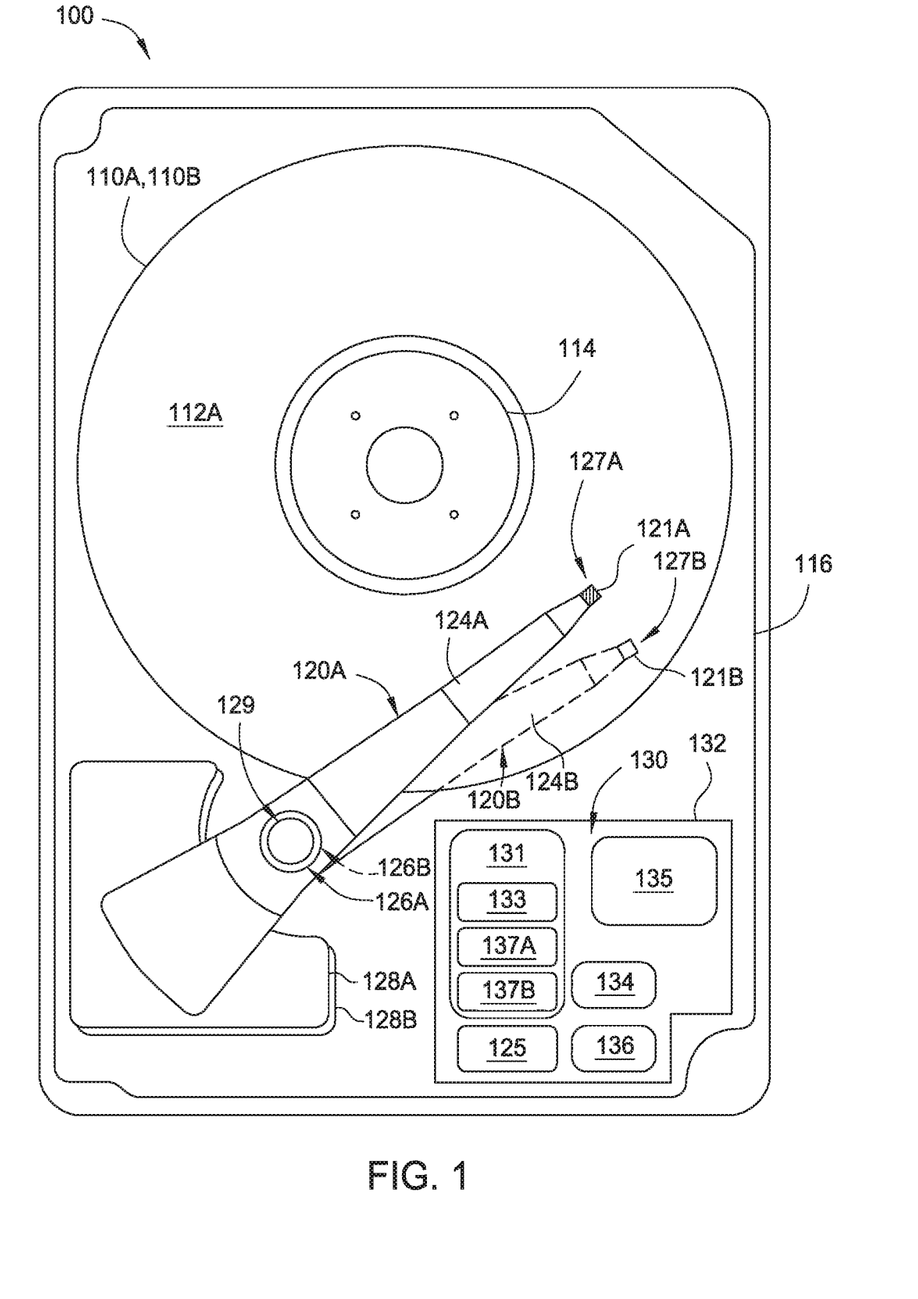
FIG. 1 is a schematic view of an exemplary hard disk drive, according to one embodiment.

FIG. 1 is a schematic view of an exemplary hard disk drive (HDD) 100, according to one embodiment. For clarity, HDD 100 is illustrated without a top cover. HDD 100 includes multiple storage disks 110A, 110B each including one or two recording surfaces on which a plurality of concentric data storage tracks are disposed. In FIG. 1, only the top surface 112A of storage disk 110A is illustrated. Storage disks 110A, 110B are coupled to and rotated by a spindle motor 114 that is mounted on a base plate 116. Two or more actuator arm assemblies 120A, 120B are also mounted on base plate 116, and each of the assemblies includes one or more suspensions on which one or more sliders (only one slider 121A or 121B is shown for each actuator arm assembly in FIG. 1) are mounted with one or more magnetic read/write heads (only one head 127A or 127B is shown in FIG. 1). The magnetic read/write heads read data from and write data to the data storage tracks of an associated recording surface 112A or 112B. One or more actuator arms 124A are included in actuator arm assembly 120A, and one or more actuator arms 124B are included in actuator arm assembly 120B. Actuator arm assembly 120A and the one or more actuator arms 124A included therein are rotated together about a bearing assembly 126A by a voice coil motor (VCM) 128A independently from actuator arm assembly 120B. Likewise, actuator arm assembly 120B and the one or more actuator arms 124B included therein are rotated together about a bearing assembly 126B by a VCM 128B independently from actuator arm assembly 120A. Bearing assemblies 126A, 126B share a shaft 129. Thus, each of voice coil motors 128A, 128B moves a group of the sliders (e.g., 121A or 121B) radially relative to a recording surface 112A (112B) of a storage disk 110, thereby providing radial positioning of a read/write head (e.g., 127A or 127B) over a desired concentric data storage track. Spindle motor 114, the read/write heads including read/write heads 127A, 127B, and voice coil motors 128A, 128B are coupled to electronic circuits 130, which are mounted on a printed circuit board 132. The read/write heads (e.g., 127A, 127B) may be coupled to the electronic circuits via a preamplifier (not shown in FIG. 1; e.g., 320B in FIG. 3) that may be mounted on a flexible circuit or elsewhere in the HDA.

Figure 2:
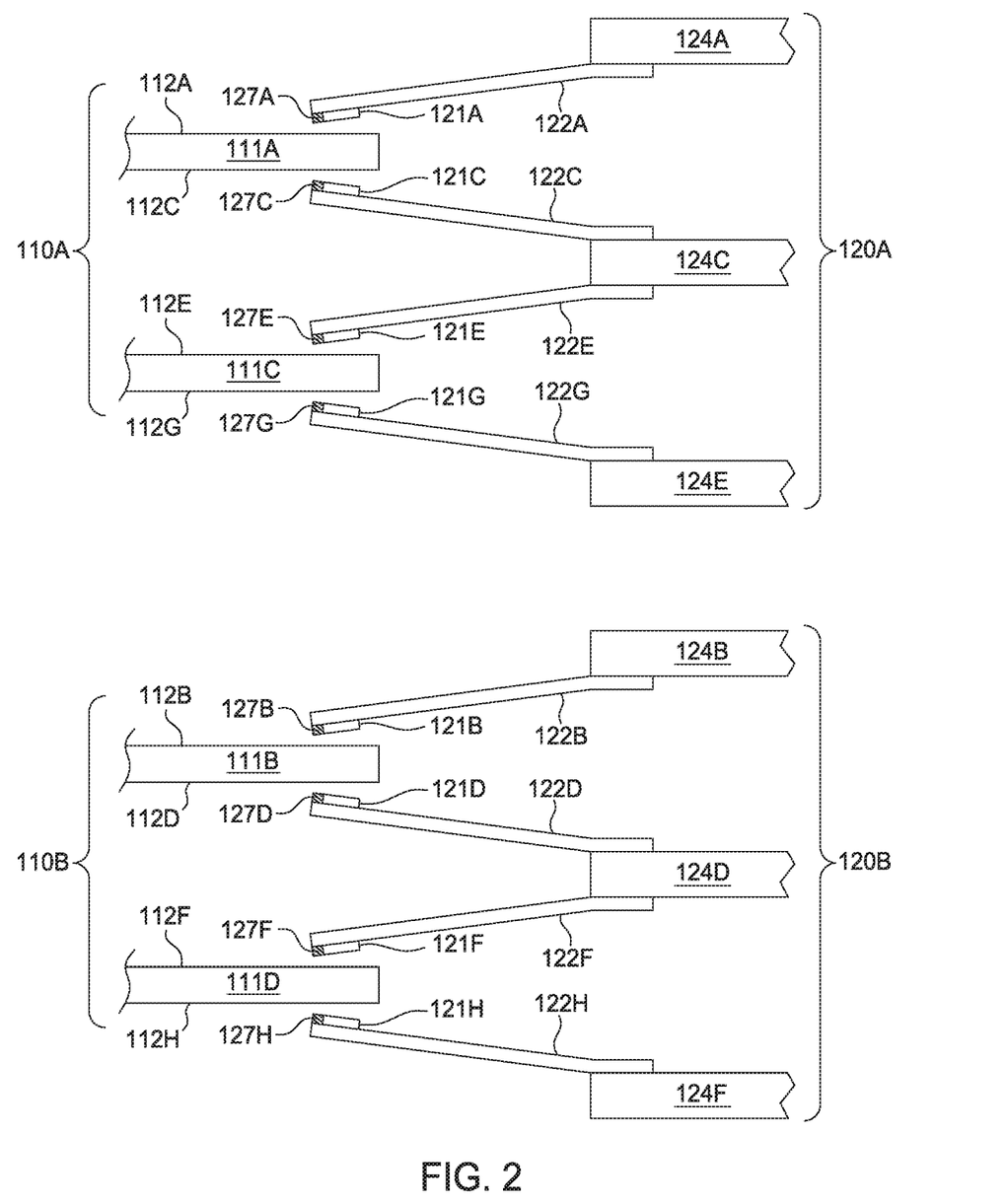
FIG. 2 schematically illustrates a partial side-view of the multiple storage disks and multiple actuators of a hard disk drive, according to an embodiment.

FIG. 2 schematically illustrates a partial side-view of multiple storage disks 110A, 110B and two independent actuator arm assemblies 120A, 120B of HDD 100, according to an embodiment. The recording surfaces of multiple storage disks 110A are each accessed by one of the read/write heads included in the independent actuator arm assembly 120A (e.g., read/write heads 127A, 127C, 127E, and 127G), and the recording surfaces of multiple storage disks 110B are each accessed by the read/write heads included in the independent actuator arm assembly 120B (e.g., read/write heads 127B, 127D, 127F, and 127H). In the example of FIG. 2, HDD 100 is configured with multiple storage disks 110A having two disks 111A, 111C with a total of four recording surfaces 112A, 112C, 112E, and 112G and multiple read/write heads 127A, 127C, 127E, and 127G each corresponding to one of these recording surfaces. Additionally, HDD 100 has multiple storage disks 110B having two disks 111B, 111D with a total of four recording surfaces 112B, 112D, 112F, and 112H and multiple read/write heads 127B, 127D, 127F, and 127H each corresponding to one of these recording surfaces. Specifically, in the embodiment illustrated in FIG. 2, HDD 100 includes: a storage disk 111A with recording surfaces 112A and 112C; a storage disk 111C with recording surfaces 112E and 112G; a storage disk 111B with recording surfaces 112B and 112D; and a storage disk 111D with recording surfaces 112F and 112H. HDD 100 further includes: read/write heads 127A, 127C, 127E, and 127G that each correspond to one of recording surfaces 112A, 112C, 112E, and 112G of storage disks 110A; and read/write heads 127B, 127D, 127F, and 127H that each correspond to one of recording surfaces 112B, 112D, 112F, and 112H of storage disks 110B. Thus, read/write head 127A reads data from and writes data to one of recording surfaces 112A, read/write head 127B reads data from and writes data to corresponding recording surface 112B, and so on.

Read/write heads 127A-127H are disposed on sliders 121A-121H, respectively, and sliders 121A-121H are mounted on suspensions 122A-122H, which are attached to the ends of actuator arms 124A-124F. In the embodiment illustrated in FIG. 2, slider 121A is mounted on suspension 122A of actuator arm 124A, sliders 121C and 121E are respectively mounted on suspensions 122C, 122E of actuator arm 124C, slider 121G is mounted on suspension 122G of actuator arm 124E, slider 121B is mounted on suspension 122B of actuator arm 124B, sliders 121D and 121F are respectively mounted on suspensions 122D, 122F of actuator arm 124D, and slider 121H is mounted on suspension 122H of actuator arm 124F. Actuator arms 124A, 124C, and 124E are included in actuator arm assembly 120A, and actuator arms 124B, 124D, and 124F are included in actuator arm assembly 120B. In an embodiment of the invention, actuator arm assemblies 120A and 120B are independently controlled and both rotate about shaft 129.

Returning to FIG. 1, electronic circuits 130 include read channels 137A, 137B, a microprocessor-based controller 133, random-access memory (RAM) 134 (which may be a dynamic RAM (DRAM) and is used as one or more data buffers) and/or a flash memory device 135, and in some embodiments a flash manager device 136. In some embodiments, read channels 137A, 137B and microprocessor-based controller 133 are included in a single chip, such as a system-on-chip (SoC) 131. HDD 100 further includes a motor-driver chip 125 that accepts commands from microprocessor-based controller 133 and drives spindle motor 114, and voice coil motors 128A, 128B. Each of read/write channels 137A, 137B communicates with read/write head 127A (127B) via a preamplifier (not shown) that may be mounted on a flex-cable that is itself mounted on either base plate 116 or actuator arm 124A (124B), or both. Electronic circuits 130 and motor-driver chip 125 are described below in greater detail in conjunction with FIG. 3.

Figure 3:
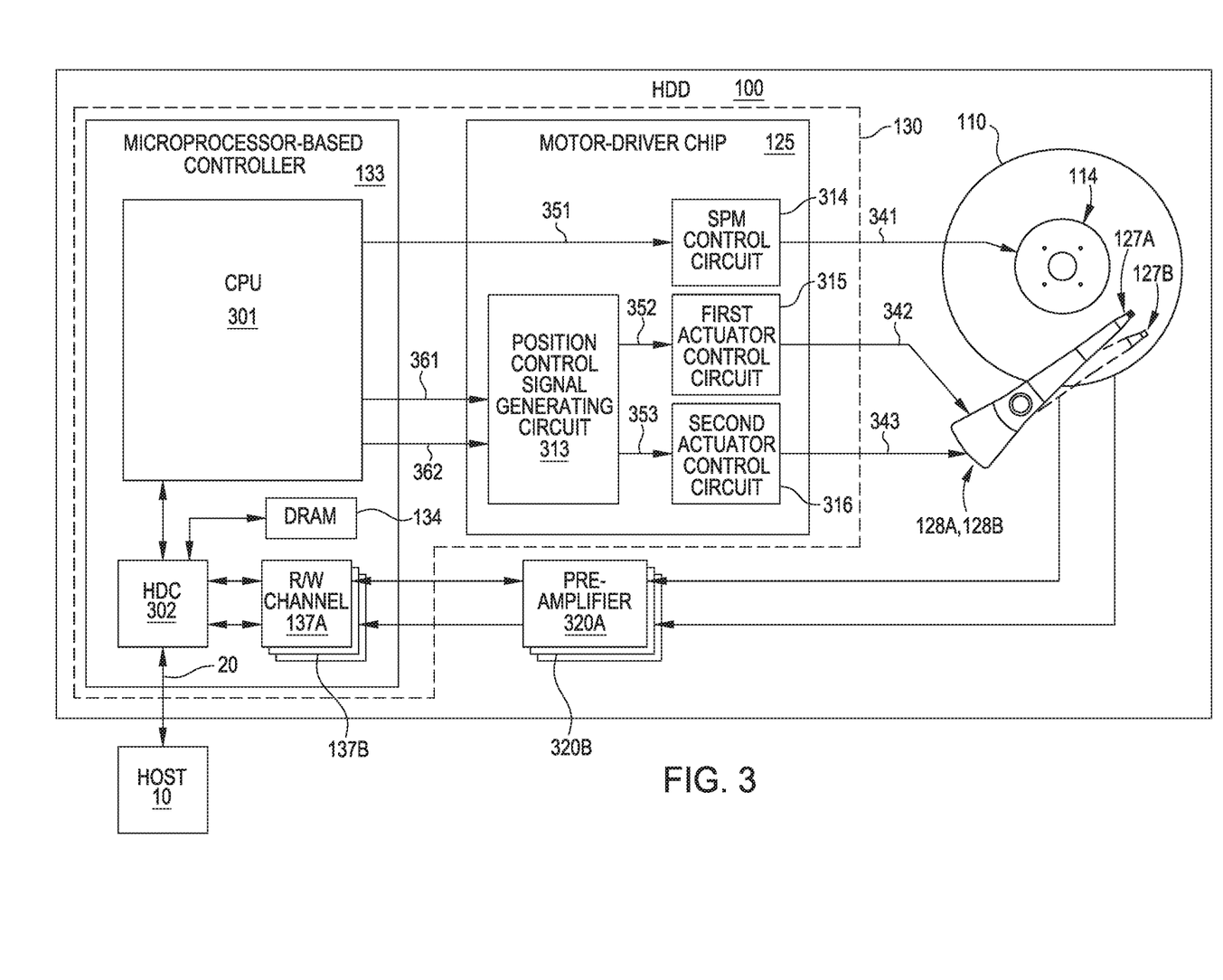
FIG. 3 illustrates an operational diagram of a hard disk drive, with elements of electronic circuits and a motor-driver chip configured according to one embodiment.

FIG. 3 illustrates an operational diagram of HDD 100, with some elements of electronic circuits 130 and motor-driver chip 125 shown configured according to one embodiment. HDD 100 is connected to a host 10, such as a host computer, via a host interface 20, such as a serial advanced technology attachment (SATA) bus or a Serial Attached Small Computer System Interface (SAS) bus. As shown, microprocessor-based controller 133 includes a one or more central processing units (CPU) 301 or other processors, a hard disk controller (HDC) 302, a DRAM 134, and read/write channels 137A, 137B, while motor-driver chip 125 includes a position control signal generating circuit 313 (e.g., Driver IC), a spindle motor (SPM) control circuit 314, a first actuator control circuit 315, and a second actuator control circuit 316. The DRAM may be integrated on the same die as the controller 133, or it may be included in a separate die in the same package as the controller 133, or it may be in a separate package mounted on the circuit board 130. HDD 100 further includes preamplifiers 320A, 320B each mounted either on actuator arms 124A and 124B or elsewhere inside the HDA. Each of preamplifiers 320A, 320B supplies a write signal (e.g., current) to read/write head 127A (127B) in response to write data input from read/write channel 137A (137B). In addition, each of preamplifiers 320A, 320B amplifies a read signal output from read/write head 127A (127B) and transmits the read amplified read signal to read/write channel 137A (137B).

CPU 301 controls HDD 100, for example according to firmware stored in flash memory device 135 or another nonvolatile memory. For example, CPU 301 manages various processes, including a dividing process for logically dividing two or more recording surfaces, a writing process for writing data into the divided surfaces, and a reading process for reading data from the divided surfaces, which are performed by HDC 302, read/write channels 137A, 137B, read/write heads 127A, 127B, recording surfaces 112A, 112B, and/or motor-driver chip 125. Read/write channels 137A, 137B are signal processing circuits that encode write data input from HDC 302 and output the encoded write data to respective preamplifiers 320A, 320B. Read/write channels 137A, 137B also decode read signals transmitted from respective preamplifiers 320A, 320B into read data that are outputted to HDC 302. In some embodiments, each of read/write channels 137A, 137B includes a single read channel and a single write channel, whereas in other embodiments, the read/write channel includes multiple write channels and/or multiple read channels for read/write heads 127A, 127B. HDC 302 controls access to DRAM 134 by CPU 301, read/write channels 137A, 137B, and host 10, and HDC 302 receives/transmits data from/to host 10 via interface 20. In some embodiments, the components of microprocessor-based controller 133 (e.g., CPU 301, HDC 302, DRAM 134, and read/write channels 137A, 137B) are implemented as a one-chip integrated circuit (i.e., as an SoC). Alternatively, one or more of CPU 301, HDC 302, DRAM 134, and read/write channels 137A, 137B can each be implemented as a separate chip.

Motor-driver chip 125 drives the spindle motor 114, a first actuator (that includes voice coil motor 128A, actuator arms 124A, and bearing assembly 126A), and a second actuator (that includes voice coil motor 128B, actuator arms 124B, and bearing assembly 126B). Specifically, SPM control circuit 314 generates a drive signal 341 (a drive voltage or a drive current) in response to a control signal 351 received from the CPU 301, and feedback from the spindle motor 114, and supplies the control signal to spindle motor 114. In this way, spindle motor 114 rotates storage disks 110. In addition, first actuator control circuit 315 generates a drive signal 342 (drive voltage or drive current) in accordance with a received position control signal 352, and supplies the drive signal 342 to the first actuator (voice coil motor 128A). In this way, the first actuator positions read/write heads (e.g., 127A) radially with respect to a recording surface (e.g., 112A). Further, second actuator control circuit 316 generates a drive signal 343 in accordance with a received position control signal 353, and supplies the position control signal 343 to the second actuator (voice coil motor 128B). In this way, the second actuator positions read/write heads (e.g., 127B) radially with respect to a recording surface (e.g., 112B). Position control signal generating circuit 313 generates position control signals 352, 353 in response to control signals 361, 362 (e.g., control values for VCMs 128A, 128B) from CPU 301, respectively.

In an embodiment, a first servo system (e.g., CPU 301, read/write channel 137A, preamplifier 320A, first actuator control circuit 315, and voice-coil motor 128A) performs positioning of a read/write head (e.g., 127A) over a corresponding recording surface (e.g., 112A), during which CPU 301 determines an appropriate current to drive through the voice coil of voice coil motor 128A. Typically, the appropriate current is determined based in part on a position feedback signal of the read/write head, i.e., a position error signal (PES). On the other hand, a second servo system performs positioning of a read/write head 127B over a corresponding recording surface 112B. The second servo system includes, for example, CPU 301, read/write channel 137B, preamplifier 320B, second actuator control circuit 316, and voice-coil motor 128B. During the positioning of a read/write head (e.g., 127B), CPU 301 determines an appropriate voltage to drive through the voice coil of voice coil motor 128B. Typically, the appropriate current for voice coil motor 128B is determined based in part on a position feedback signal of the read/write head, i.e., a position error signal (PES). Although a single CPU 301 is shown here, it is possible that multiple CPUs might be used (for example, one CPU for each actuator).

Figure 4A:
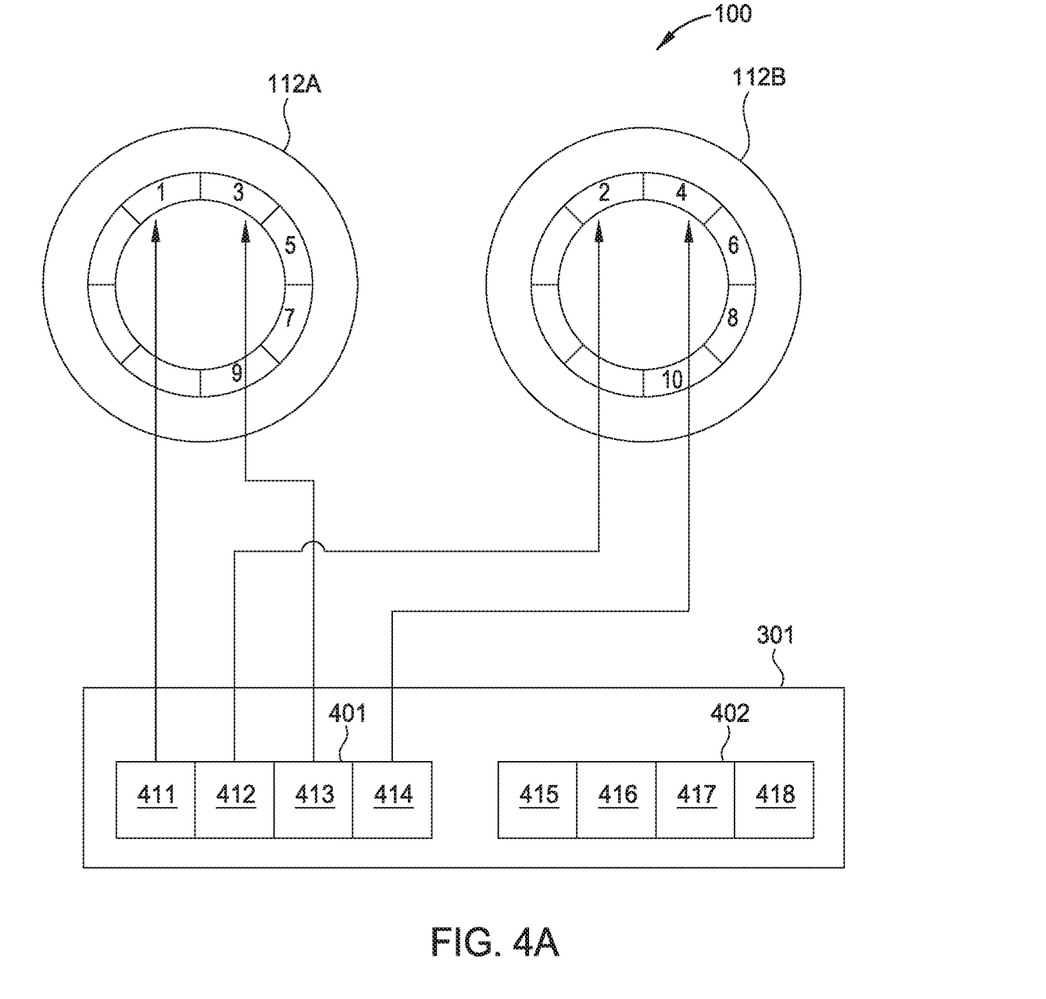
FIGS. 4A and 4B illustrate a process for dividing a recording area of two recording surfaces into blocks and writing data onto each recording surface according to an embodiment.
Figure 4B:
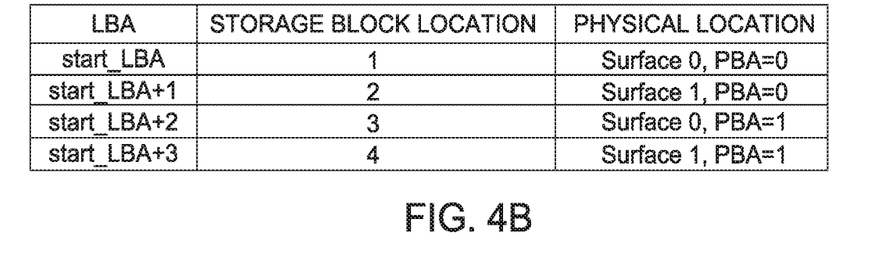

FIGS. 4A and 4B illustrate a process for dividing a recording area on two recording surfaces into storage blocks and writing data onto the recording surfaces according to an embodiment. As shown in FIG. 4A, a recording surface 112A on which data is written by read/write head 127A and a recording surface 112B on which data is written by read/write head 127B are used to store data. Each of recording surfaces 112A, 112B includes a recording area consisting of a plurality of tracks, and each of the tracks is divided into a plurality of storage blocks in advance in a manner that associates the storage blocks of recording surface 112A with the storage blocks of recording surface 112B (e.g., storage block 1 of recording surface 112A and storage block 2 of recording surface 112B are associated). The relationships between the storage blocks of recording surfaces 112A, 112B are managed by microprocessor-based controller 133 (or CPU 301), and the information that represents the relationships may be stored in the controller 133 or a predetermined storage block of each of recording surfaces 112A, 112B. This dividing operation may be done in the manufacturing process of the disk drive 100 or may be performed in response to a request from host 10. The storage block size may be determined depending on a type of data or application used in the host 10. In an embodiment, the storage block size is set to the size of a sector size of storage disks 110A, 110B or integral multiples of the sector size.

For the purpose of illustration, a single track is shown for each recording surface 112A, 112B and is divided into ten storage blocks, having sequence numbers 1 through 10. As stated above, each of the storage blocks on recording surface 112A is associated with one of storage the blocks on recording surface 112B. In response to a write request from host 10, microprocessor-based controller 133 (or CPU 301) divides received data 401, 402 into several data blocks 411-418, so that each of the data blocks fits into a storage block on recording surface 112A or 112B. Subsequently, CPU 301 alternately writes the divided data blocks 411-418 onto recording surfaces 112A, 112B via read/write heads 127A, 127B. Specifically, the divided data block 411 is written to storage block 1 of recording surface 112A via read/write head 127A, while the divided data block 412 is written to storage block 2 of recording surface 112B via read/write head 128B. Next, the data block 413 is written to storage block 3, while the data block 414 is written to storage block 4. Since the writing operations for data blocks 411 and 412 (and data blocks 413 and 414) may be carried out simultaneously, the writing data rate may be twice that of a conventional drive that is not configured with split actuators. Further, the writing performance for writing a single sequential write can also be up to twice that of a conventional split actuator drive, since such a drive is generally incapable of writing multiple portions of a single sequential write operation simultaneously.

In an embodiment, a mapping table is defined for HDD 100 to write the data blocks onto the physical storage blocks in response to a command received from host 10 according to an LBA method. In the LBA method, HDD 100 converts an LBA designated by host 100 into a physical block address (PBA) pointing to a sector on the recording surface, and positions the read/write head in the sector corresponding to the LBA. Here, the term "block" may be a single physical sector on the recording surfaces 112A, 112B (i.e., 512 bytes or 4 Kbytes), or may be a number of physical sectors. FIG. 4B shows an example of the mapping table associating an LBA with a physical location on a recording surface, i.e., a storage block location shown in FIG. 4A and/or the recording surface number and PBA. For example, the mapping table is prepared and stored in HDD 100 at the time of manufacturing. During operation, the drive may make some modifications to the mapping table, for example to avoid using blocks that are found to be defective.

In an embodiment, the above dividing and writing process may be carried out according to known algorithms for Redundant Array of Independent Drive (RAID) 0. In this case, the associated storage blocks between the different recording surfaces may be treated like a stripe defined in a RAID 0 system, and the divided data blocks are written to the recording surfaces in units of stripes.

Figure 5:
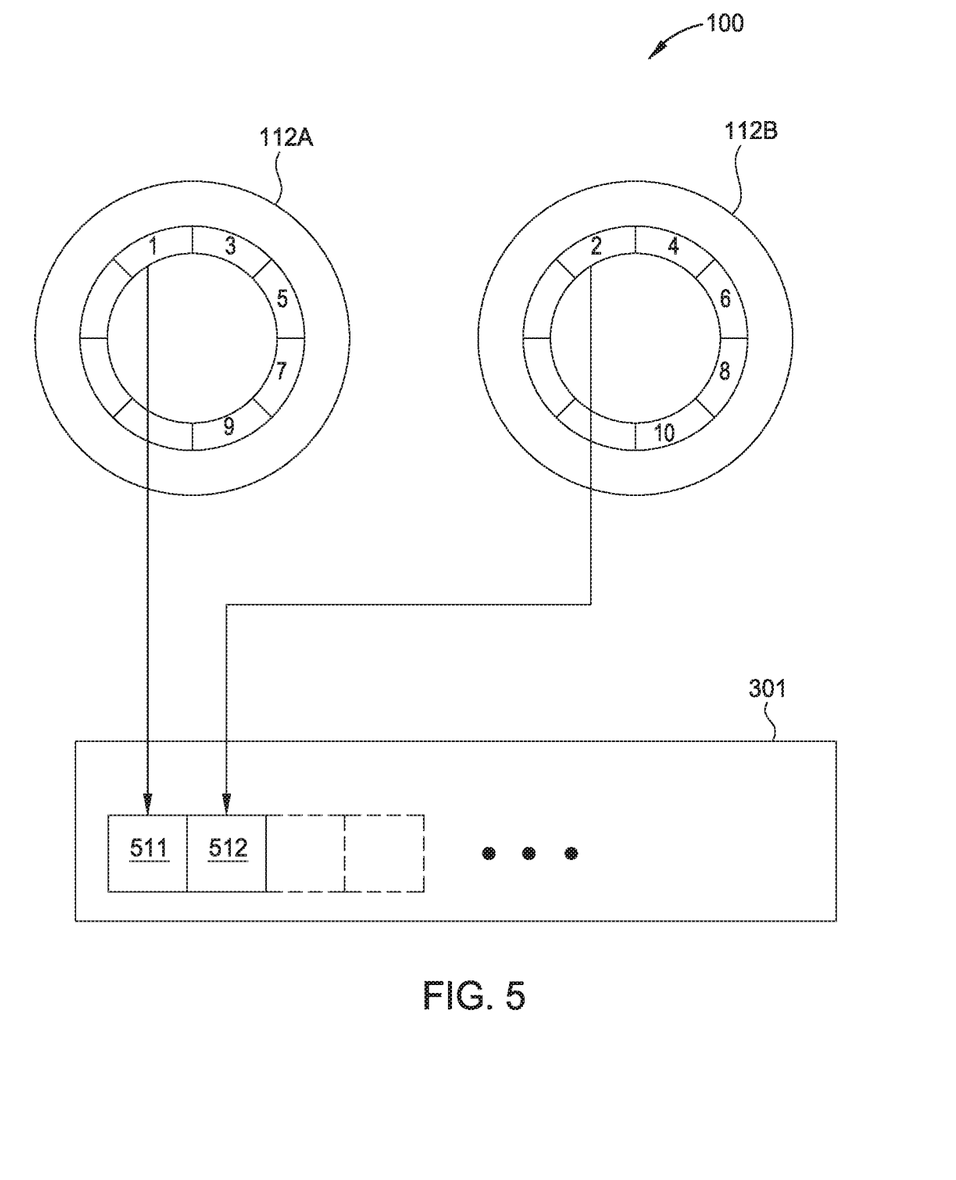
FIG. 5 illustrates a process for reading data from two recording surfaces according to an embodiment.

FIG. 5 illustrates a process for reading data from two recording surfaces according to an embodiment. As discussed above, the data received from a host 10 is written to multiple blocks on different recording surfaces, e.g., a recording surface 112A on which data is written by a read/write head 127A, and a recording surface 112B on which data is written by a read/write head 127B. In the embodiment of FIG. 5, in response to a read request from the host 10, microprocessor-based controller 133 (or CPU 301) determines, based on the address specified by the host 10, which storage blocks on each of recording surfaces 112A, 112B need to be read, and reads the determined storage blocks on recording surfaces 112A, 112B. As shown in FIG. 5, data block 511 stored in storage block 1 of recording surface 112A and data block 512 stored in storage block 2 of recording surface 112B are read by respective read/write heads 127A, 127B. Since these reading operations are carried out simultaneously, the reading data rate may be twice that of a conventional split actuator drive. Further, the reading performance for performing a single sequential read operation can also be up to twice that of a conventional split actuator drive, since such a drive is generally incapable of reading multiple portions of a single sequential read operation simultaneously. The read data blocks are merged into the original data and then transmitted to the requesting host 10.

Figure 6:
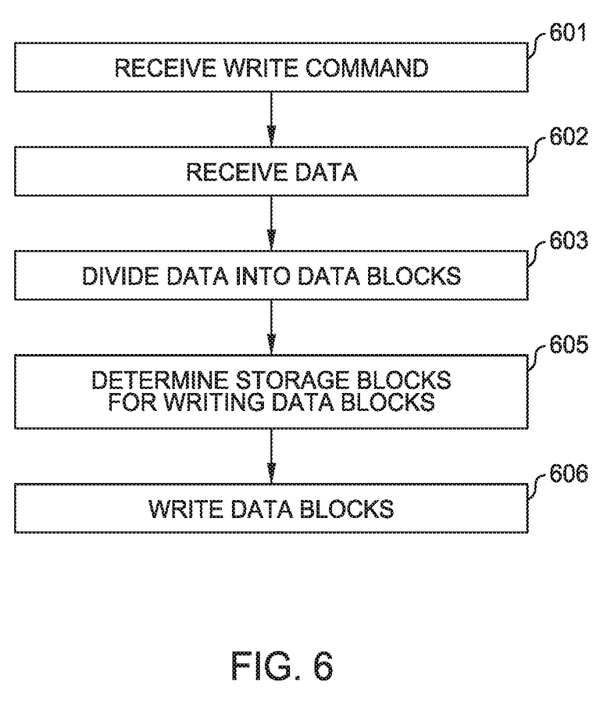
FIG. 6 sets forth a flowchart of method steps for writing data to multiple recording surfaces according to an embodiment.

FIG. 6 sets forth a flowchart of method steps for writing data to multiple recording surfaces according to an embodiment. The steps of FIG. 6 are carried out when the microprocessor-based controller 133 receives a write command from host 10.

At Step 601, the microprocessor-based controller 133 receives a write command from a queue of a host 10. At Step 602, the microprocessor-based controller 133 receives from a write buffer of the host 10 the data to be written by the write command. At Step 603, the microprocessor-based controller 133 divides the received data into multiple data blocks each having a predetermined size. At Step 604, the microprocessor-based controller 133 determines recording surfaces 112A, 112B for writing these data blocks, each of which is accessed by an independent actuator arm assembly. At Step 605, the microprocessor-based controller 133 determines one or more blocks of recording surface 112A and one or more corresponding storage blocks of recording surface 112B where the divided data blocks are written. To determine the recording surfaces and storage blocks where the data blocks are written, the microprocessor-based controller 133 refers to a predetermined mapping table that associates logical addresses to be specified by host 10 with the storage blocks. Finally, at Step 606, the microprocessor-based controller 133 writes the divided data blocks to the determined storage blocks of each of recording surfaces 112A, 112B, simultaneously. Because divided pieces of data are written to multiple recording surfaces via independent actuator arm assemblies, the sequential write transfer rate for the requested data may be higher than that of conventional drives.

Figure 7:
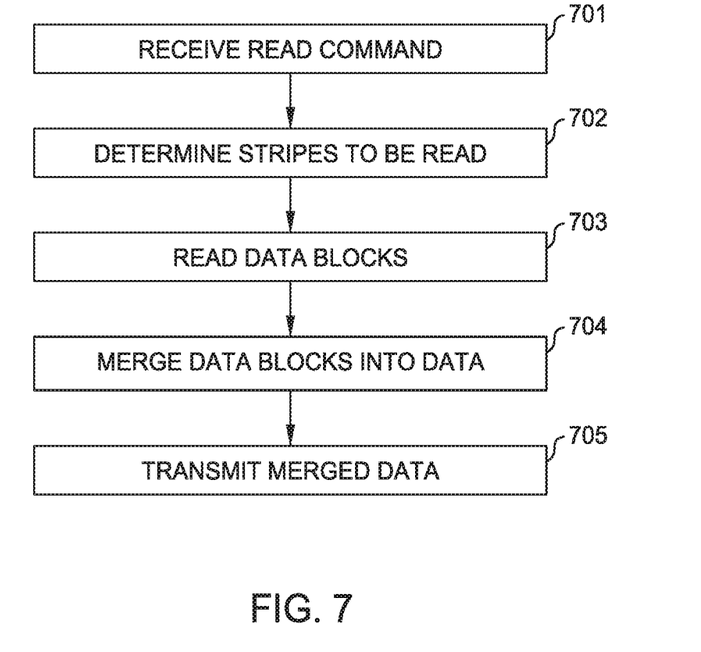
FIG. 7 sets forth a flowchart of method steps for reading data from multiple recording surfaces according to an embodiment.

FIG. 7 sets forth a flowchart of method steps for reading data from multiple recording surfaces according to an embodiment. The steps of FIG. 7 are carried out when the microprocessor-based controller 133 receives a read command from host 10.

At Step 701, the microprocessor-based controller 133 receives a read command from a queue of a host 10. At Step 702, the microprocessor-based controller 133 determines the storage blocks of recording surfaces 112A, 112B that store the data specified by the read command based on the address map. Here, the microprocessor-based controller 133 determines these storage blocks by converting a logical address specified by the host 10 into a block address of each of recording surfaces using the address map. At Step 703, the microprocessor-based controller 133 reads the data blocks from each recording surface. At Step 704, the microprocessor-based controller 133 merges the data blocks into the requested data. Finally, at Step 705, the microprocessor-based controller 133 transmits the merged data to a read buffer of the host 10. Because divided pieces of data are read from multiple recording surfaces via independent actuator arm assemblies simultaneously, the sequential read transfer rate for the entire data is higher than conventional split-actuator drives.

According to an embodiment of the invention, a plurality of divided data blocks may be handled across read/write heads on different actuators of the same HDD. Thus, when the drive receives a long sequential read/write command, the independent actuators may simultaneously seek to corresponding locations on their respective strokes to access the data. As a result, the read/write transfer rate for that sequential read/write command may be doubled compared to conventional split-actuator drives. Additionally, for long read/write operations, the actuators are generally seeking at the same time, and thus the drive does not often suffer from off-track errors of a read/write head from one actuator due to long-seek activity of the other. Furthermore, when the drive receives a plurality of small-block random read/write commands, the two actuators may operate independently to achieve double the random-R/W performance as well. In a scenario in which the divided pieces of data are stored across many storage blocks and the command size is relatively small, the data for most small-block commands may be accessible by a single actuator.

While the foregoing is directed to embodiments of the present invention, other and further embodiments of the invention may be devised without departing from the basic scope thereof, and the scope thereof is determined by the claims that follow.

We claim:

1. A method for writing data in a disk drive having a plurality of actuators that each controls a plurality of arms extending over a plurality of disk surfaces, the method comprising:
   receiving a write command from a host device;
   receiving from the host device data to be written by the write command;
   dividing the received data into data blocks;
   determining:
      a first surface from the plurality of disk surfaces where data is written by a first head of an arm controlled by a first actuator of the plurality of actuators; and
      a second surface from the plurality of disk surfaces where data is written by a second head of an arm controlled by a second actuator of the plurality of actuators;
   determining one or more storage blocks of each of the first and the second surface where the divided data blocks are written; and
   writing one or more first data blocks of the divided data blocks to the determined storage blocks of the first surface using the first head while writing one or more second data blocks of the divided data blocks to the determined storage blocks of the second surface using the second head.

2. The method according to claim 1, wherein determining the first and the second surface comprises referring to an address map that associates a logical address of the data with the storage blocks of the first and the second surface where the data is written.

3. The method according to claim 1, wherein the divided data blocks are stored in the storage blocks of the first and the second surface alternately.

4. The method according to claim 1, wherein the arm controlled by the first actuator and the arm controlled by the second actuator rotate about a same axis.

5. The method according to claim 1, wherein a size of each of the storage blocks is reconfigurable depending on a type of data written by the host device.

6. A method for reading data in a disk drive having a plurality of actuators that each controls a plurality of arms extending over a plurality of disk surfaces, the method comprising:
   receiving a read command from a host device;
   determining one or more storage blocks of a first surface of the plurality of disk surfaces and one or more storage blocks of a second surface of the plurality of disk surfaces that store data specified by the read command;
   reading one or more data blocks from the determined storage blocks of the first surface using a first actuator of the plurality of actuators while reading one or more data blocks from the determined storage blocks of the second surface using a second actuator of the plurality of actuators;
   merging the data blocks read from the first and the second surface into the specified data; and
   transmitting the merged data to the host device.

7. The method according to claim 6, wherein the storage blocks of the first and the second surface are determined based on an address map that associates a logical address of the data with the storage blocks of the first and the second surface where the data is written.

8. The method according to claim 6, wherein the data is divided and alternately stored in the determined storage blocks of the first surface and the determined storage blocks of the second surface.

9. The method according to claim 6, wherein the arm driven by the first actuator and the arm driven by the second actuator rotate about a same axis.

10. The method according to claim 6, wherein a size of each of the storage blocks is reconfigurable depending on a type of data written by the host device.

11. A disk drive comprising:
   a first actuator that controls an arm having a first head and extending over a first surface of a plurality of disk surfaces;
   a second actuator that controls an arm having a second head and extending over a second surface of a plurality of disk surfaces other than the first surface; and
   a controller configured to:
      in response to a command for writing data from a host device, write one or more first divided data blocks of the data onto one or more storage blocks of the first surface using the first head while writing one or more second divided data blocks of the data onto one or more storage blocks of the second surface using the second head; and
      in response to a command for reading data from the host device, read the first divided data blocks of the data from the storage blocks of the first surface using the first head while reading the second divided data blocks of the data from the storage blocks of the second surface using the second head.

12. The disk drive according to claim 11, wherein the controller stores an address map that associates a logical address of the data with the storage blocks of the first and the second surface where the data is written.

13. The disk drive according to claim 11, wherein the data is divided and alternately written onto the storage blocks of the first and the second surface.

14. The disk drive according to claim 11, wherein the arm controlled by the first actuator and the arm controlled by the second actuator rotate about a same axis.

15. The disk drive according to claim 11, wherein a size of each of the storage blocks is reconfigurable depending on a type of data written by the host device.

* * * * *